United States Patent
Schmidt et al.

(10) Patent No.: US 9,204,116 B2
(45) Date of Patent: Dec. 1, 2015

(54) PORTABLE LASER PROJECTION DEVICE FOR MEDICAL IMAGE DISPLAY

(75) Inventors: Robert Schmidt, Munich (DE); Nils Frielinghaus, Heimstetten (DE); Holger-Claus Rossner, Feldkirchen (DE); Uli Seifert, Mark Schwaben (DE); Alexander Pfaeffle, Erding (DE)

(73) Assignee: Brainlab AG, Feldkirchen (DE)

( * ) Notice: Subject to any disclaimer, the term of this patent is extended or adjusted under 35 U.S.C. 154(b) by 2984 days.

(21) Appl. No.: 11/362,439

(22) Filed: Feb. 24, 2006

(65) Prior Publication Data

US 2006/0235849 A1    Oct. 19, 2006

Related U.S. Application Data

(60) Provisional application No. 60/665,419, filed on Mar. 25, 2005.

(30) Foreign Application Priority Data

Feb. 24, 2005   (EP) ..................................... 05004032

(51) Int. Cl.
   *H04N 9/31*   (2006.01)
(52) U.S. Cl.
   CPC ................... *H04N 9/3129* (2013.01)
(58) Field of Classification Search
   CPC ..................................................... H04N 9/3129
   See application file for complete search history.

(56) References Cited

U.S. PATENT DOCUMENTS

| | | | |
|---|---|---|---|
| 5,611,797 A | 3/1997 | George et al. | |
| 5,715,836 A | 2/1998 | Kliegis et al. | |
| 5,772,593 A * | 6/1998 | Hakamata | 600/407 |
| 5,947,981 A * | 9/1999 | Cosman | 606/130 |
| 6,006,126 A | 12/1999 | Cosman | |
| 6,175,610 B1 | 1/2001 | Peter | |
| 6,289,235 B1 * | 9/2001 | Webber et al. | 600/426 |
| 6,314,311 B1 * | 11/2001 | Williams et al. | 600/425 |
| 6,317,616 B1 | 11/2001 | Glossop | |
| 6,690,357 B1 | 2/2004 | Dunton et al. | |
| 2002/0016541 A1 * | 2/2002 | Glossop | 600/407 |
| 2003/0164172 A1 * | 9/2003 | Chumas et al. | 128/898 |
| 2004/0017518 A1 * | 1/2004 | Stern et al. | 348/744 |
| 2004/0242988 A1 | 12/2004 | Niwa et al. | |
| 2005/0286123 A1 * | 12/2005 | Abu-Ageel | 359/443 |

FOREIGN PATENT DOCUMENTS

| | | |
|---|---|---|
| DE | 44 40 225 | 3/1996 |
| DE | 4440225 | 3/1996 |

(Continued)

OTHER PUBLICATIONS

Maria Mamalui-Hunter et al. "Linac mechanic QA using a cylindrical phantom." 2008 Phys. Med. Biol. 53 5139 doi: 10.1088/0031-9155/53/18/019.*

(Continued)

*Primary Examiner* — Bo J Peng
(74) *Attorney, Agent, or Firm* — Tucker Ellis, LLP

(57) ABSTRACT

A medical image display system includes an image storage and image processing device for storing, processing and outputting image data relating to a patient's body and/or additional image data. The system also includes a portable laser projection device that projects the image data and/or additional image data onto a projection location.

25 Claims, 1 Drawing Sheet

(56) References Cited

FOREIGN PATENT DOCUMENTS

| | | |
|---|---|---|
| DE | 196 39 615 A1 | 4/1998 |
| DE | 100 08 806 | 12/2001 |
| DE | 201 21 429 | 8/2002 |
| EP | 0 982 676 | 3/2000 |
| EP | 0982676 | 3/2003 |
| WO | 02/073387 | 9/2002 |
| WO | 02073387 | 9/2002 |

OTHER PUBLICATIONS

Mishin, Andrey V. "Portable Linear Accelerators for Commercial Applications." Prepared for Publication in the Proceedings of Electron Beam Curing of Composites Workshop, Oak Ridge, Tennesee, Sep. 10-11, 1997.*

* cited by examiner

PORTABLE LASER PROJECTION DEVICE FOR MEDICAL IMAGE DISPLAY

RELATED APPLICATION DATA

This application claims priority of U.S. Provisional Application No. 60/665,419 filed on Mar. 25, 2005, which is incorporated herein by reference in its entirety.

FIELD OF THE INVENTION

The present invention relates to a medical image display system and, more particularly, to a method and apparatus for displaying an image during a medical procedure.

BACKGROUND OF THE INVENTION

Medical image display systems are used to support doctors in diagnosis and therapy, particularly in preparation for and during surgery. Medical image display systems process patient data that have been previously acquired using image detection equipment, e.g., tomographic imaging methods (CT or MR scanners) or using projection methods such as x-ray transillumination. The image data relating to the patient's body and/or additional data (e.g., data for treatment planning) are conventionally made accessible to doctors and treatment staff with the aid of screen displays.

A system using a screen display, for example, is known from DE 19 639 615 C2. Such screen displays, however, are disadvantageous in that the relatively large screen is provided statically, such that the doctor must continuously look up from his work area toward the screen in order to read the information on the monitor. In other cases, the monitor is fixed to relatively complicated joint arms to enable movement of the monitor into the vicinity of the surgeon's field of vision. Such constructions, however, are expensive and often the monitor itself becomes an obstruction.

Projection is another method of medical image display. Projection systems for patient or surgery planning data are known, for example, from U.S. Pat. Nos. 5,715,836; 6,317,616; and 6,314,311. In these systems, however, complicated projection devices are used that are not always appropriate or cannot be realized without significant additional expense.

SUMMARY OF THE INVENTION

A medical image display system can include an image storage and image processing device, wherein image data relating to the patient's body and/or additional image data can be stored, processed and outputted. In accordance with the invention, the medical image display system comprises a portable laser projection device, which can project the image data and/or additional image data from the image storage and processing device onto a projection location. The image data can be data referencing the patient's anatomy, and the data can be adapted and displayed. Typically, such data have been previously obtained from tomographic images or projection transillumination images, for example. Image data also can be obtained from computer-generated data (e.g., from video data stored in terms of position and orientation during surgery). Additional image data can include all possible data that may concern the planning and support of surgical procedures. For example, planned instrument trajectories can be displayed, as can the actual location of instruments. Further, the additional image data can take the form of intuitive representations (e.g., arrows, tunnel representations, concentric circles, etc.), which can be used by the doctor as a guide during treatment.

As used herein, a "portable laser projection device" is defined as a laser projection device that need not be arranged statically in order to fulfil its function. In other words, the device can be freely moved (e.g., it can be held and aligned by hand and/or it can be portable in the sense that it is carried by a moving or moved medical instrument). Preferably, the entire projection device is portable, e.g., the device is not just a "transportable" image deflection unit.

An advantage of the present invention over the screen and/or monitor image display systems discussed above is that the screen or monitor is no longer needed. New-generation laser projection devices are capable of producing monochrome as well as color projections at a projection location, wherein the projections are similar in quality to monitor images, even when the images are miniaturized (e.g., via a miniature laser projector which allows the projection device to be held between two fingers of a hand). The doctor no longer must look up to a statically arranged monitor or arrange the monitor such that it is visible while at the same time not creating an obstruction. Instead, the doctor, via the portable laser projection device, can have the desired image projected at a location that is most comfortable for him to view. The doctor can either temporarily hold the projection device himself or can have it held by an assistant; either way, the doctor can directly and quickly move the image to a convenient location. Since the laser projection device can be portable, it is superior to conventional projection systems, since the projections (e.g., projections onto the body) can be easily made from various directions and positions without obstructing the doctor's work area and without the doctor's work compromising the projection of the image (e.g., if he enters the projection beam).

The image storage and image processing device can be part of a medical navigation system or can be assigned to a medical navigation system. Navigation systems are known which store image data relating to the patient's body and locate instruments to assign the actual instrument position to the data relating to the body. Since in most cases medical navigation systems already have the image data available, the navigation systems can be employed within the framework of the present invention as an image memory or image processing unit. An image output, as used within the framework of navigation systems, refers to image data that are made available as a data output, for example, as opposed to an actual image display (monitor, projection) that uses a display screen.

If a medical navigation system is provided, then the portable laser projection device can be equipped with a navigation reference that can be located and positionally defined by the navigation system. This is advantageous in that the laser projection, e.g., the image display itself, can be adapted to the position of the projection device. This has a positive effect if parts of the patient's anatomy or data relevant to the surgical plan are themselves projected onto the patient's body. Thus, for example, the direction of the proposed incision can be correctly projected onto a navigated part of the patient's body, provided the projection device itself also is navigated (e.g., located by means of the navigation reference).

The laser projection device also can be arranged on a medical instrument or integrated into a medical instrument. In this sense, the word "portable" is to be understood such that the instrument carries the laser projection device. This enables image and navigation support to be provided directly at the treatment location, such that the precision in which the instrument is used is enhanced. It is then advantageous if the medical instrument itself also comprises a navigation reference, such that the instrument can be located and positionally defined by the navigation system. If the instrument and projector are rigidly coupled, one navigation reference is sufficient.

In accordance with one embodiment, the laser projection device can be arranged in fixed or movable configuration on a medical treatment apparatus or on a treatment support apparatus, in particular on one the following apparatus:
- a surgical microscope;
- an imaging apparatus, e.g., a tomographic imaging apparatus, C-arc x-ray apparatus or a fluoroscope;
- a radiation treatment apparatus (LINAC);
- an operating lamp;
- a pointer;
- an invasive instrument, e.g., a scalpel;
- a biopsy needle holding device;
- a biopsy needle.

The invention further provides a medical image display method in which an image storage and image processing device can store, process and output image data relating to the patient's body and/or additional image data. Further, the image data and/or additional image data output by the image storage and image processing device can be projected onto a projection location using a portable laser projection device.

This image display method naturally provides the advantages already described above over conventional image display in medical engineering. Image data and/or additional image data derived from a medical navigation system can be projected, wherein the image data can be data relating to a patient's anatomy, such as projections from tomographic images and transillumination images. The additional image data can comprise auxiliary representations, such as navigation instructions in the form of arrows, direction indicators and/or alignment instructions, or outlines of structures or 3D-objects.

The image data and/or additional image data can be projected onto a part of a patient's body by the laser projection device, wherein the laser projection device can be integrated in or arranged on a medical instrument. Further, both the part of the patient's body and the laser projection device or instrument can be located and positionally defined by the navigation system.

The laser projection device can be used in combination with the navigation system as a user interface, such as a dynamic user interface or a virtual input unit. The device also can be assigned to a video camera tracking system and can output the image information captured by said system.

The laser projection device can further be used to project a known and diversifying model onto a surface of the body, for example, wherein the projected model is recorded or (re-) detected by a video camera. This can enable the surface form of the body to be deduced from the form or deformity of the model, which can be used for registration purposes. The model can be classified in the sense of the "additional image data" already described above.

The forgoing and other features of the invention are hereinafter discussed with reference to the drawings.

BRIEF DESCRIPTION OF THE DRAWINGS

The forgoing and other embodiments of the invention are hereinafter discussed with reference to the drawings.

DETAILED DESCRIPTION

Figure 1:
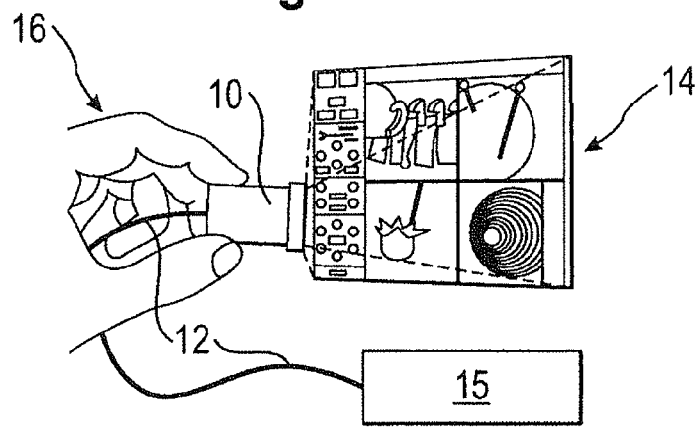
FIG. 1 illustrates an exemplary medical image display with a non-navigated miniature laser projector in accordance with the invention.

With reference to FIG. 1, an exemplary portable miniature laser projector 10 according to the invention is shown held by an operator's hand 16. The laser projector 10 receives data from an image storage and image processing device 15 via the data lead 12. The device 15 can be a medical navigation system or the like, which can supply image data (e.g., a first image data such as patient information) and additional image data (e.g., a second image data such as navigational information) for display. A device (not shown) for producing light beams also can be located between the device 15 and the laser projector 10. Alternatively, all the systems can be integrated into the image storage and processing device 15, such that only a single lead 12 couples device 15 and the laser projector 10. The image storage and processing device 15 also includes all the sub-systems (not shown) typically found in navigation systems, such as, for example, tracking cameras, reference markers and reference marker arrangements, infrared light sources, etc.

As shown in FIG. 1, an image can be projected onto a projection location by the miniature laser projector 10, wherein the image contains all the information that otherwise would be displayed on monitors/screens of navigation systems. The projection image 14 can offer the operating doctor all possible information concerning the patient's body, the current position of the patient and instrument, and/or planned incision trajectories. Moreover, the projection location can be freely selected (as opposed to the limited viewing locations of conventional monitors).

Figure 2:
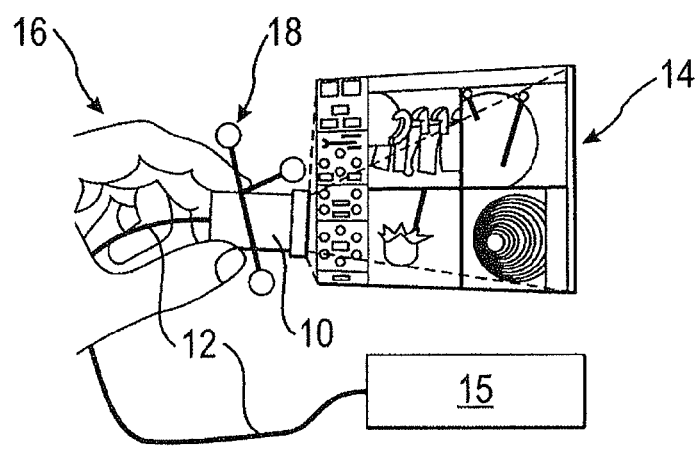
FIG. 2 illustrates an exemplary medical image display with a navigated miniature laser projector in accordance with the invention.

FIG. 2 shows another exemplary laser projector 10', wherein the laser projector 10' also includes a navigation reference 18. The navigation reference 18 is positionally located and detected by the image storage and processing device 15, and this enables the image 14 to be adapted according to the position of the projector 10'. This can be useful, for example, when projecting onto located projection surfaces and when the projector 10' itself is at a relatively acute angle to the projection surface. Once the position of the projector 10' has been taken into account, the image can be adapted and output as if it were being projected perpendicular to the projection surface.

Figure 3:
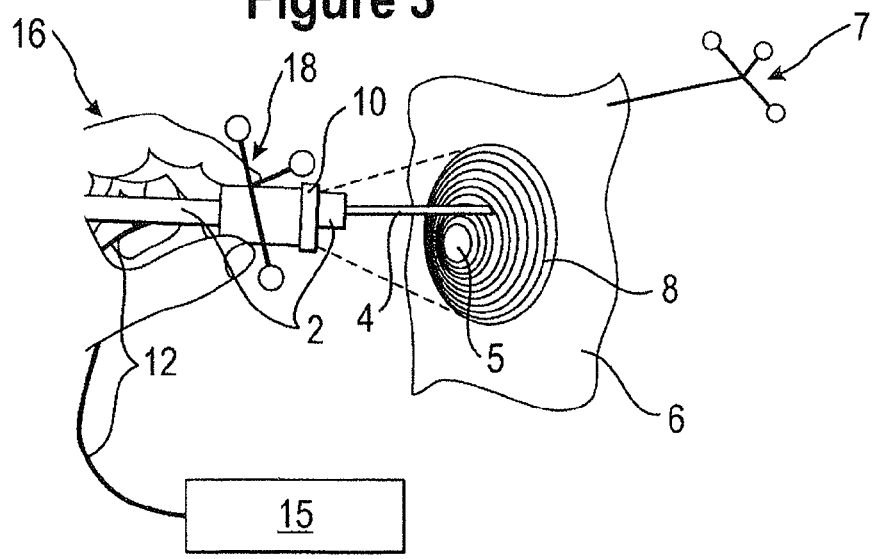
FIG. 3 illustrates an exemplary miniature laser projector on a surgical instrument with a projected instrument guiding aid in accordance with the invention.

FIG. 3 illustrates another way of using the navigated miniature laser projector 10', wherein an instrument 2 is shown along with its functional portion 4, (e.g., a blade). The laser projector 10' is shown fixed or integrated on said instrument 2, and includes a navigation/location reference 18. In the present example, the laser projector 10' projects an auxiliary representation 8 onto the surface of a part of a patient's body 6. The part of the body 6 is only shown as an extract, and a navigation reference 7, which is fixed to the part of the body 6, is also shown schematically. The part of the body 6 can be the cranial surface of a patient, for example, in which an incision is to be made with the blade 4 of the instrument 2.

In order to assist the operating doctor in guiding the instrument 2 at the correct angle and in making the incision at the correct location, auxiliary information can be projected onto the part of the body 6 by the projector 10'. In the example of FIG. 3, concentric circles 8 with a center 5 are projected on the surface of the body part 6. This is possible because the position of the instrument 2 and the laser projector 10 is known to the image storage and processing device 15 via the navigation reference 18, as is the position of the part of the patient's body 6 via the reference star 7.

Image information thus can be projected onto the patient by means of the projector 10', thereby providing data that assists the operating surgeon in guiding the instrument 2. For example, if the circles 8 are all concentric, then the instrument is said to be correctly aligned. If the circles are oval and diverge in one direction, then the instrument is said to be pitched incorrectly in the one direction. Another piece of information, for example, is the central location 5 of the image information, which can indicate the point of incision for the tip of the blade 4.

In addition to or instead of the auxiliary information/guidelines 5, 8, parts of the body lying under the skin also can be projected on the surface of the body part. Thus, the operating doctor can be supplied with a navigation system which on the one hand can dispense with monitors for image display and on the other hand displays all the necessary image data in a location where it is most important to have it, i.e., at the operating location itself. Such a laser projection in accordance with the invention also can be carried out in addition to a screen or monitor display.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A medical image display system, comprising:
   an image storage and image processing device that stores, processes and outputs at least one of a first image data relating to a patient's body or a second image data; and
   a hand-held laser projection device that projects the at least one of the first image data or the second image data output by the image storage and image processing device onto a projection location, wherein the hand-held laser projection device comprises a navigation reference that can be located and positionally defined by a medical navigation system,
   wherein the image storage and image processing device is configured to adapt the first and second image data according to a detected angle of the hand-held laser projection device.

2. The image display system as set forth in claim 1, wherein the image storage and image processing device is a part of a medical navigation system or is assigned to the medical navigation system.

3. The image display system as set forth in claim 2, wherein the laser projection device is arranged on a medical instrument or is integrated into a medical instrument.

4. The image display system as set forth in claim 3, wherein the laser projection device is removably attached to the instrument.

5. The image display system as set forth in claim 3, wherein the medical instrument comprises a navigation reference that can be located and positionally defined by the navigation system.

6. The image display system according to claim 3, wherein the medical instrument is a hand-held medical instrument.

7. The image display system as set forth in claim 1, wherein the laser projection device is or can be arranged on a medical treatment apparatus or on a treatment support apparatus.

8. The image display system as set forth in claim 7, wherein the laser projection device is removably attached to the treatment apparatus.

9. The image display system of claim 7, wherein the medical treatment apparatus comprises at least one of:
   a surgical microscope;
   an imaging apparatus,
   a radiation treatment apparatus;
   an operating lamp;
   a pointer;
   an invasive instrument;
   a biopsy needle holding device; or
   a biopsy needle.

10. The image display system of claim 7, wherein the medical treatment apparatus comprises a tomographic imaging apparatus, a C-arc x-ray apparatus or a fluoroscope.

11. A method for displaying medical image data provided by an image storage and image processing device that stores, processes and outputs image data, comprising:
    providing image data from the image storage and image processing device to a hand-held laser projection device, said image data relating to at least one of a patient's body or additional image data; and
    using the hand-held laser projection device to project said image data onto a projection location, wherein the hand-held laser projection device is tracked by a medical navigation system via a navigation reference attached to the hand-held laser projection device, and
    wherein the image storage and image processing device is configured to adapt the image data according to a detected angle of the hand-held laser projection device.

12. The image display method as set forth in claim 11, wherein the step of providing image data and/or additional image data includes deriving said data from the medical navigation system.

13. The image display method as set forth in claim 11, wherein providing image data includes providing image data referencing the patient's anatomy.

14. The image display method of claim 13, where providing image data referencing the patient's anatomy includes using data from tomographic images and/or transillumination images.

15. The image display method as set forth in claim 11, wherein providing additional image data includes providing information in addition to the patient's body.

16. The image display method as set forth in claim 15, wherein providing information in addition to the patient's body includes providing auxiliary representations, navigation instructions and/or alignment instructions.

17. The image display method as set forth in claim 16, wherein providing navigational instructions includes providing instructions in the form of arrows and/or as direction indicators.

18. The image display method as set forth in claim 11, wherein projecting the image data and/or additional image data onto a projection location includes projecting said data onto a part of a patient's body.

19. The image display method as set forth in claim 18, further comprising positionally defining a location of an instrument and the hand-held laser projection device, wherein said hand-held laser projection device is arranged on or integrated in said instrument.

20. The image display method as set forth in claim 11, further comprising using the hand-held laser projection device in combination with a navigation system to form a user interface.

21. The image display method as set forth in claim 20, wherein forming a user interface includes forming a dynamic user interface and/or a virtual input unit.

22. The image display method as set forth in claim 11, further comprising assigning the hand-held laser projection device to a video camera tracking system and outputting the image information captured by said camera tracking system.

23. The image display method as set forth in claim 11, further comprising using the hand-held laser projection device to project a known and diversifying model onto a surface of the body for registration purposes, wherein the projected model is recorded or (re-)detected by a video camera to deduce the form of the surface of the body from the form or deformity of the model.

24. A medical image display system, comprising:
an image storage and image processing device that stores, processes and outputs image data, said image data including at least one of first image data corresponding to a patient's body or second image data that includes graphical images; and
a hand-held laser projection device that projects the image data output by the image storage and image processing device onto a projection location, wherein the hand-held laser projection device comprises a navigation reference that can be located and positionally defined by a medical navigation system,
wherein the image storage and image processing device is configured to adapt the first and second image data according to a detected angle of the hand-held laser projection device.

25. The image display system according to claim 24, wherein the graphical images are at least one of arrows, tunnel representations or concentric circles.

* * * * *